July 12, 1938. F. T. POTTER Re. 20,797

LATHE

Original Filed March 5, 1936 3 Sheets-Sheet 1

Inventor
Frederick T. Potter
By Roberts, Cushman & Woodbury
his Attys.

July 12, 1938. F. T. POTTER Re. 20,797

LATHE

Original Filed March 5, 1936 3 Sheets-Sheet 2

Inventor:
Frederick T. Potter
By Roberts, Cushman & Woodbury
his Attys.

July 12, 1938. F. T. POTTER Re. 20,797
LATHE
Original Filed March 5, 1936 3 Sheets-Sheet 3
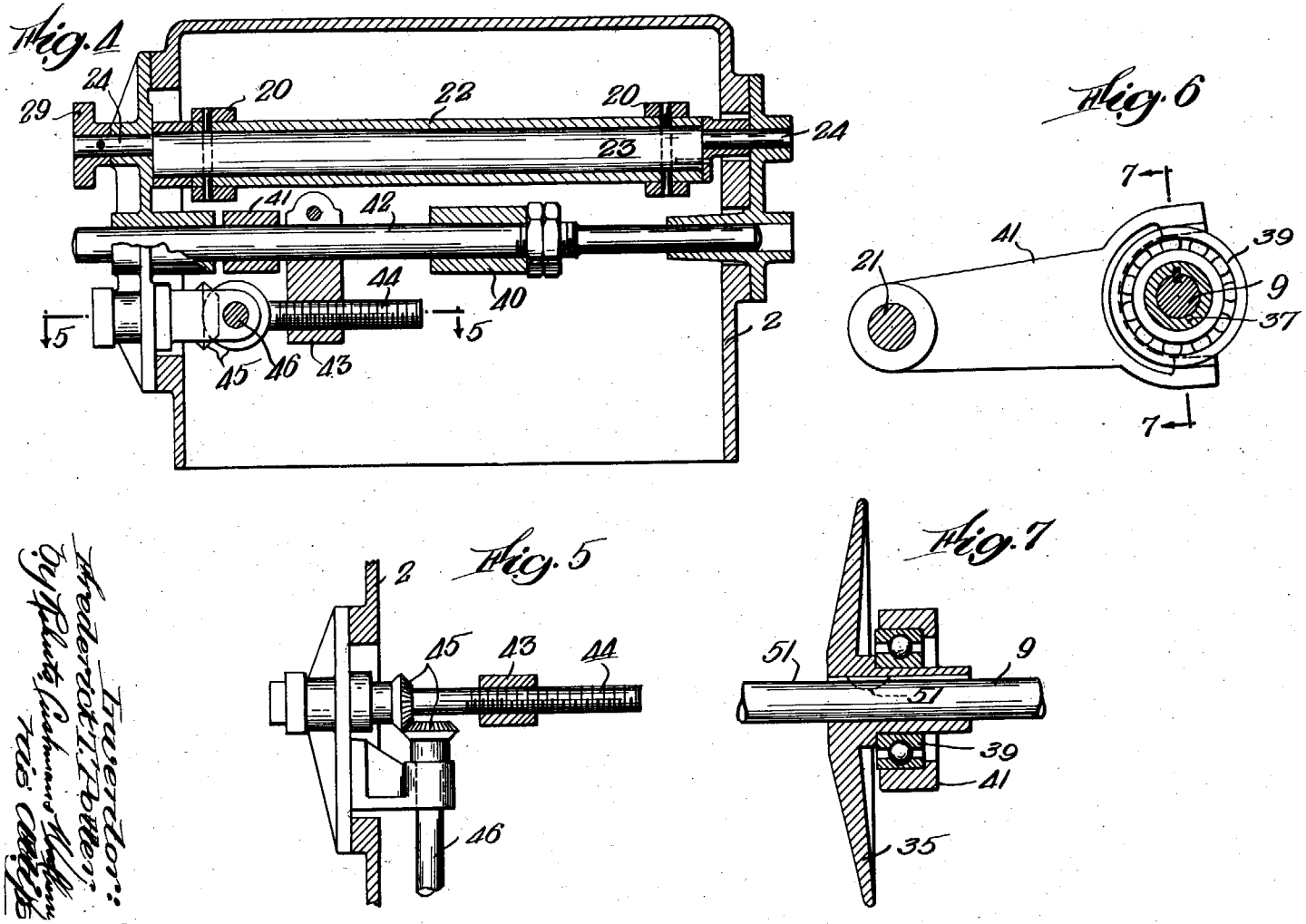

Reissued July 12, 1938

Re. 20,797

UNITED STATES PATENT OFFICE 20,797

LATHE

Frederick T. Potter, Whitinsville, Mass., assignor to Stark Tool Company, Waltham, Mass., a corporation of Massachusetts Original No. 2,081,641, dated May 25, 1937, Serial No. 67,241, March 5, 1936. Application for reissue February 7, 1938, Serial No. 189,175

13 Claims. (Cl. 82—28)

Figure 1:
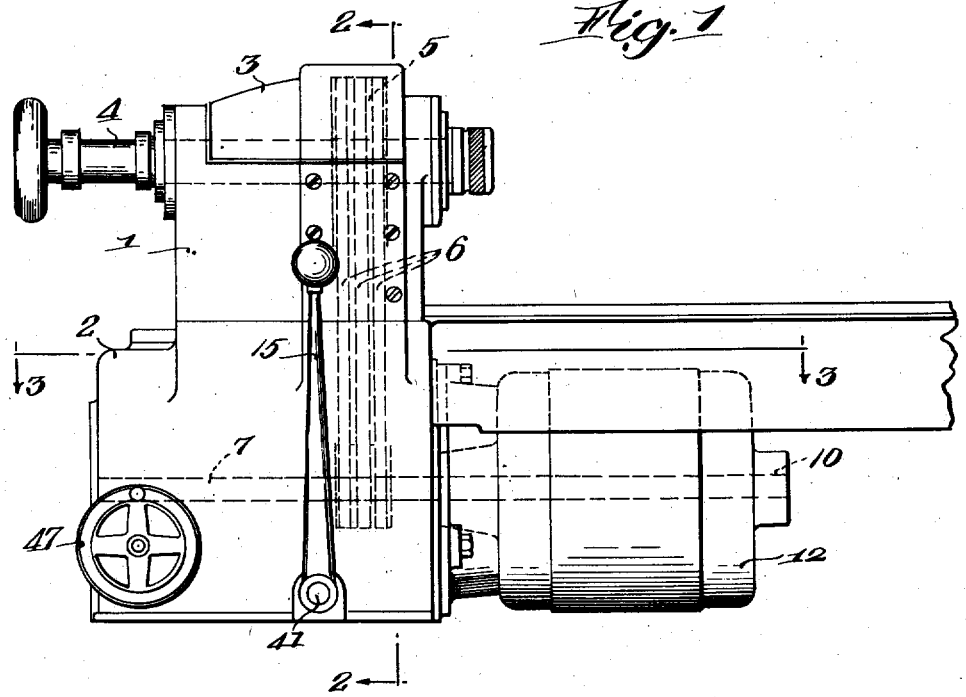
Figure 2:
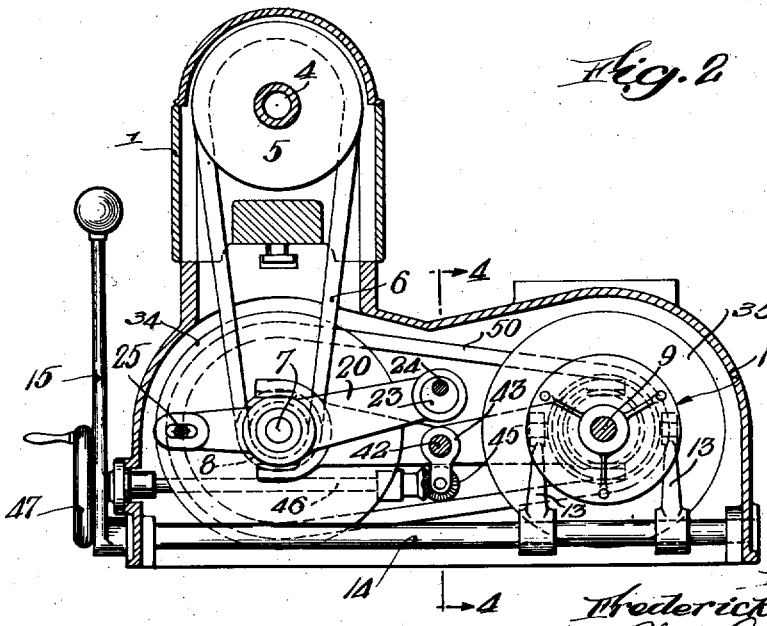
Figure 3:
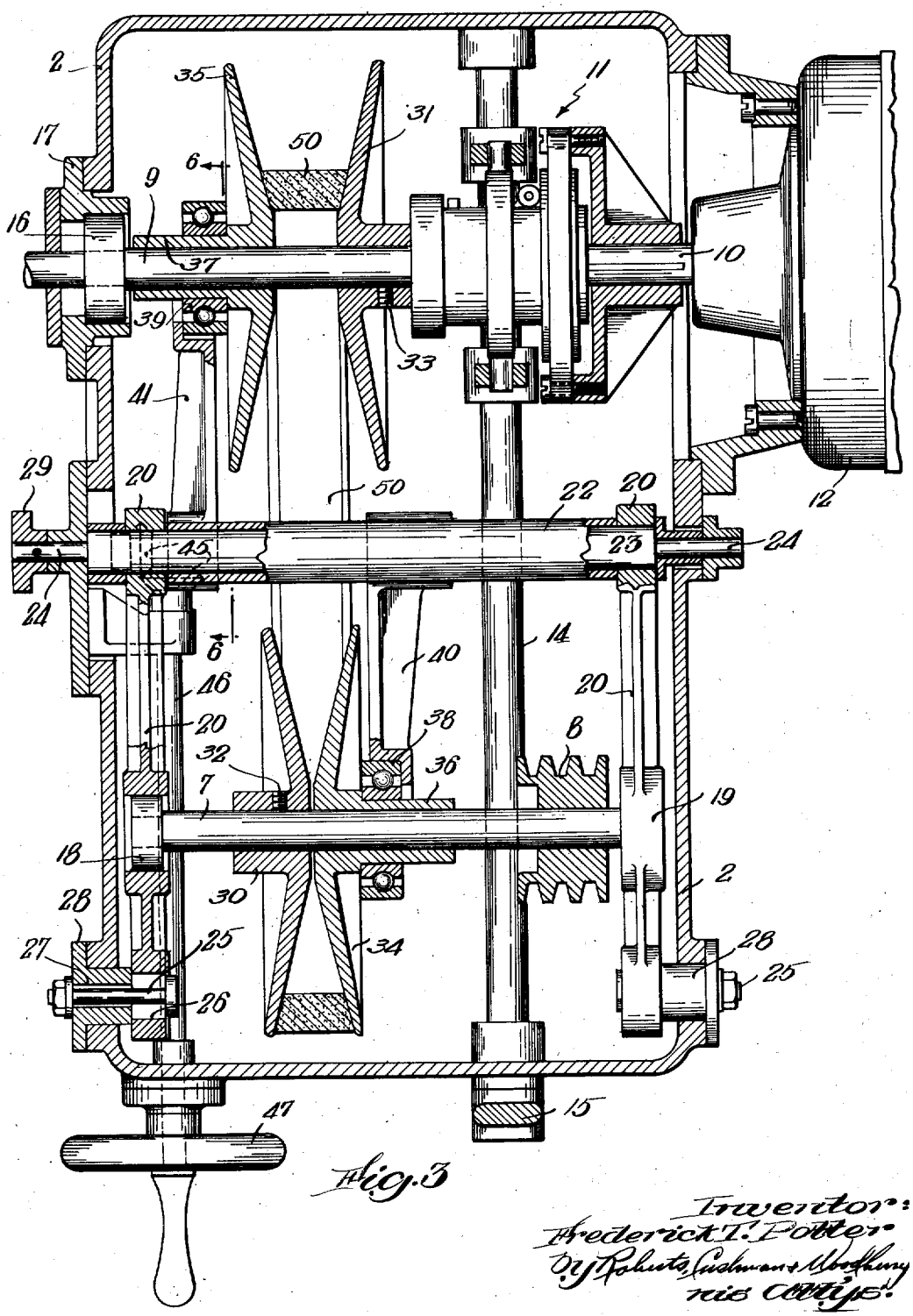

Objects of the present invention are to provide a lathe which is compact and light in weight, which is inexpensive to manufacture and durable in use, which has a wide speed range, and which is convenient to use. Other objects are to provide a bench lathe which occupies a minimum of bench space, which requires no openings in the bench for belts or other parts, which has no overhead mechanism, leaving the space around the spindle unobstructed at the front, back and both sides, which is ready for use as soon as it is set on a bench and plugged into a power socket, which can be shifted from one location to another merely by detaching the plug and carrying it to the new location, which is only slightly longer than the stock which it takes so as to require a minimum of space lengthwise of the bench, which has an extensive base from front to rear to steady the frame against vibration, which can be gradually varied in speed while running without use of rheostats or reactors, which affords ready access to the motor for lubrication and repairs without waste of bench space or obstruction by the motor and generally to improve the art of bench lathes and like tools. Other objects will be evident from the illustration of a typical embodiment shown in the accompanying drawings, in which:

Fig. 1 is a front elevation of the lathe;
Fig. 2 is a section on line 2—2 of Fig. 1;
Fig. 3 is a section on line 3—3 of Fig. 1;
Fig. 4 is a section on line 4—4 of Fig. 2;
Fig. 5 is a section on line 5—5 of Fig. 4;
Fig. 6 is a section on line 6—6 of Fig. 3; and
Fig. 7 is a section on line 7—7 of Fig. 6.

The particular embodiment of the invention chosen for the purpose of illustration comprises a head-stock casing formed in upper and lower parts 1 and 2, the upper part having a removable section 3, a head-stock spindle 4 journaled in the upper portion of the casing and carrying a pulley 5 adapted to accommodate three belts 6, a countershaft 7 located directly below the spindle 4 and in the same vertical plane therewith, the shaft 7 carrying a pulley 8 in line with the pulley 5, a driven shaft 9 in the rear of the countershaft 7 and in the same horizontal plane therewith, a driving shaft 10 in axial alignment with the driven shaft 9, a clutch 11 for kinematically interconnecting the shafts 9 and 10 and a motor 12 for driving the shaft 10. The clutch 11 is of well-known construction and therefore need not be described in detail, the clutch being actuated through the medium of clutch arms 13 (Fig. 2), a shaft 14 and a handle 15 located in front of the head-stock casing. Instead of being journaled directly in the casing 2 the shaft 9 is supported by a ball-bearing 16 mounted in a collar 17 which in turn is mounted in an opening in the casing 2.

The countershaft 7 is supported by suitable bearings 18 mounted in hubs 19 integral with and intermediate the ends of a pair of arms 20. The rear ends of the arms 20 surround a sleeve 22 and are pinned thereto (Fig. 4), the sleeve 22 being mounted on a shaft 23 which is eccentrically mounted in the casing as shown at 24. The forward ends of the arms 20 are supported by bolts 25 extending through horizontal slots 26 in the arms (Fig. 3) and thence through vertical slots 27 in sleeves 28 mounted in openings in the casing 2. Thus after loosening the bolts 25 the arms may be moved lengthwise to adjust the shaft 7 horizontally by rotating the eccentric shaft 21 by means of the handwheel 29 outside the casing 2; and by moving the bolts 25 upwardly or downwardly in the slots 27 the shaft 7 may be adjusted vertically. After the shaft 7 is adjusted to desired position, either horizontally or vertically, or both, it is secured in adjusted position by tightening the bolts 25.

Mounted in alignment on the countershaft 7 and the driven shaft 9 are two V-pulleys having opposite stationary cones 30 and 31 fast to their respective shafts by set-screws 32 and 33 and having opposite adjustable cones 34 and 35 movable along their respective shafts and keyed to the shafts as shown at 51 (Fig. 7). The movable cones 34 and 35 have hubs 36 and 37 carrying ball-bearings 38 and 39, the outer rings of which are interengaged with the ends of arms 40 and 41 respectively (Fig. 6). As shown in Fig. 4 the other ends of the arms 40 and 41 are fast to a rod 42 mounted for endwise movement in the casing 2. Intermediate the two arms 40 and 41 the rod 42 carries a depending lug 43 threaded to receive the threaded shaft 44. The shaft 44 is kinematically interconnected by bevel gears 45 with a shaft 46 leading to a handwheel 47 in front of the casing 2.

By turning the handwheel 47 in one direction the rod 42 and the arms 40 and 41 are moved to the right (Figs. 1, 3 and 4) and by turning the handwheel in the opposite direction these parts are moved to the left. When the rods and arms are moved to the right the cone 34 is moved away from its complementary cone 30 and the cone 35 is moved toward its complementary cone 31; and when the rod 42 is moved to the left the cone 34 is moved toward its complementary cone 30 and the cone 35 is moved away from its complementary cone 31. As shown in Fig. 3, the movable cones are in their left-hand positions so that the belt 50, which is trained over the two pulleys, engages the cones 30 and 34 near their outer peripheries and the cones 31 and 35 near their inner peripheries, thereby driving the countershaft 7 much slower than the driven shaft 9. When the cones 34 and 35 are moved to the right to their other extreme position the belt 50 engages the cones 30 and 34 near their inner peripheries and the cones 31 and 35 near their outer peripheries, thereby driving the countershaft 7 much faster than the driven shaft 9. By adjusting the position of the arms 40 and 41 to intermediate positions any desired intermediate speed ratio may be obtained.

From the foregoing it will be evident that my improved lathe is compact in construction and convenient in use, the controls being located in front of the head-stock casing in convenient positions and the means for adjusting the countershaft 7 either vertically or horizontally, thereby to adjust the tension either on belts 6 or belt 50, being located outside the casing at the left-hand end thereof. It will also be noted that all of the controls and adjustments may be operated while the lathe is running.

By locating the countershaft between the spindle and the bench, with the drive shaft behind the countershaft, the center of gravity of the tool is near the bench, the space around the spindle (front, back and both sides) is unobstructed, the motor may be located close to the bench behind the bed where it is not in the way and where it does not increase the length of bench space required for the tool, the entire transmission may be enclosed in a compact L-shaped casing, the weight of the tool may be reduced in marked degree, and the two external controllers may be located at the lower front of the tool, where they are out of the way and yet readily accessible, without a complicated train of mechanism to the parts which they control. By leaving unobstructed the space immediately back of the spindle, screw-feed attachments may extend along the back of the lathe and be geared to the spindle from the rear in accordance with common practice in lathes having the motor overhead or underneath.

It should be understood that the present disclosure is for the purpose of illustration only, and that this invention includes all modifications and equivalents which fall within the scope of the appended claims.

I claim:

1. A lathe comprising a spindle, a pulley for driving the spindle, a countershaft, a pulley on the countershaft, a belt trained over said pulleys, a driven shaft, means supporting said countershaft for movement toward and away from both said spindle and driven shaft, a driving shaft, a clutch for interconnecting the driving and driven shafts, V-pulleys on said driven and countershafts respectively, said V-pulleys having opposite stationary cones fast to their respective shafts and opposite adjustable cones movable along their respective shafts, means for moving said adjustable cones in unison, means coacting with said means supporting said countershaft for moving said countershaft toward and away from said driven shaft and said spindle and means for locking said countershaft in adjusted position.

2. A lathe comprising a spindle, a pulley for driving the spindle, a countershaft, a pulley on the countershaft, a belt trained over said pulleys, a driven shaft, means supporting said countershaft for movement toward and away from both said spindle and driven shaft, a driving shaft, a clutch for interconnecting the driving and driven shafts, V-pulleys on said driven and countershafts respectively, said V-pulleys having opposite stationary cones fast to their respective shafts and opposite adjustable cones movable along their respective shafts, means for moving said adjustable cones in unison, means associated with the countershaft supporting means for moving it toward and away from said spindle, and means associated with the countershaft supporting means for moving it toward and away from said driven shaft, one of said means being effective to lock said countershaft in adjusted position.

3. A lathe comprising a spindle, a pulley for driving the spindle, a countershaft, a pulley on the countershaft, a belt trained over said pulleys, a driven shaft, pivotal arms supporting said countershaft for movement toward and away from both said spindle and driven shaft, a driving shaft, a clutch for interconnecting the driving and driven shafts, V-pulleys on said driven and countershafts respectively, said V-pulleys having opposite stationary cones fast to their respective shafts and opposite adjustable cones movable along their respective shafts, means for moving said adjustable cones in unison, means coacting with one of said pivotal arms for producing relative adjustment of said driven and countershafts toward and from each other, and means coacting with the other end of said pivotal arms for producing relative adjustment of said spindle and countershaft toward and from each other.

4. A lathe comprising a spindle, a pulley for driving the spindle, a countershaft, a pulley on the countershaft, a belt trained over said pulleys, a driven shaft, a driving shaft, a clutch for interconnecting the driving and driven shafts, V-pulleys on said driven and countershafts respectively, said V-pulleys having opposite stationary cones fast to their respective shafts and opposite adjustable cones movable along their respective shafts, a belt trained over said V-pulleys, means for moving said adjustable cones in unison, a pair of pivoted arms supporting said countershaft intermediate their ends, means for shifting said arms lengthwise to adjust the tension of one of said belts, and means for swinging the arms about their pivots to adjust the tension of the other of said belts.

5. A bench lathe comprising a base adapted to seat on a bench, a drive shaft journaled in the base with its axis extending parallel with the front of the lathe, a countershaft journaled in the base in front of and parallel with the drive shaft, a spindle journaled above and parallel with the countershaft, continuously-variable change-speed means kinematically interconnecting said drive shaft and countershaft, and vertically extending means interconnecting said countershaft and spindle.

6. A bench lathe comprising a casing formed in upper and lower parts, a spindle journaled in said upper part, a countershaft journaled in said lower part under the spindle, a belt interconnecting said shaft and spindle within said casing, a drive shaft journaled in said lower part behind said countershaft, and change-speed transmission of the adjustable-width V-pulley type interconnecting said drive shaft and countershaft.

7. A bench lathe comprising a head casing, a bed extending from one side of the casing above the bench, two shafts journaled in the base below the top of the bed, said shafts comprising a countershaft substantially in the vertical plane of the bed and a drive shaft behind and parallel to the countershaft, a head-stock spindle substantially in said plane above said countershaft, horizontally extending means kinematically interconnecting said drive shaft and countershaft, and vertically extending means kinematically interconnecting said countershaft and spindle, one of said means comprising change-speed mechanism.

8. A bench lathe comprising a head casing, a bed extending from one side of the casing, a spindle in the upper part of the casing, a countershaft in the casing under the spindle, a belt interconnecting said shaft and spindle, a drive shaft in the casing behind said countershaft, change-speed transmission of the adjustable-width V-pulley type interconnecting said drive shaft and countershaft, and a motor connected to the drive shaft on said side of the casing behind said bed.

9. A bench lathe comprising a bed having at its head and tail ends supports to seat upon the bench and to hold the bed in spaced relation to the bench, the head support comprising a casing of substantial depth from front to rear, thereby to afford an extended base for the head end of the bed, a horizontal drive shaft journaled in the rear part of the casing, a countershaft journaled in the forward part of the casing below the level of the bed, a spindle journaled in the upper part of the casing above the level of the bed, drive connections within the casing between the countershaft and spindle, variable speed drive connections within the casing between the drive shaft and countershaft, and a manually actuable controller exposed at the outside of the casing for varying the speed of the countershaft relatively to the drive shaft while the lathe is running.

10. A bench lathe comprising a bed having at its tail and head ends supports to seat upon a bench and to hold the bed in spaced relation to the bench, the head support comprising a hollow L-shaped casing having its horizontal leg resting upon the bench and directed to the rear, a motor secured to said horizontal leg behind said bed, and spindle driving means including change-speed mechanism housed within said casing.

11. A bench lathe comprising a bed and a spindle having its axis disposed above the bed and extending longitudinally of the latter, an L-shaped head casing forming a support for the head end of the bed, the spindle being journaled in the upper part of the vertical leg of the casing, a motor mounted on the side of the lower leg of the casing behind said bed, a drive shaft actuated by the motor having its axis below and to the rear of the spindle axis, a countershaft parallel to the drive shaft and journaled at the front end of the lower leg of the casing below the level of the spindle, drive connections between the countershaft and spindle, and variable speed connections between the drive shaft and the countershaft, said variable speed connections comprising pulleys of variable effective diameters upon the respective shafts, and manually actuable means outside the casing operative to vary the diameters of said pulleys inversely and simultaneously.

12. A bench lathe comprising a bed, a spindle, continuously-variable change-speed means, casing means including a lower forward part fast to said bed and an upper forward part enclosing said spindle and a lower rearward part below the level of the spindle and behind said lower forward part for mounting said change-speed means, and kinematic means for interconnecting said spindle and change-speed means.

13. A bench lathe comprising a bed, a spindle, continuously-variable change-speed means, casing means including a lower forward part fast to said bed and an upper forward part enclosing said spindle and a lower rearward part below the level of the spindle and behind said lower forward part for mounting said change-speed means, and kinematic means for interconnecting said spindle and change-speed means, the rear wall of said upper forward part being juxtaposed to the spindle to accommodate screw-feed attachments along the back of the spindle.

FREDERICK T. POTTER.